US012789382B2

(12) United States Patent
Arroyo et al.

(10) Patent No.: US 12,789,382 B2
(45) Date of Patent: Nov. 10, 2026

(54) ROBOTIC BUTLER EVENT DEPLOYMENT

(71) Applicant: Truist Bank, Charlotte, NC (US)

(72) Inventors: Yadhira Haydee Arroyo, Chicago, IL (US); John Walker, Mint Hill, NC (US)

(73) Assignee: TRUIST BANK, Charlotte, NC (US)

( * ) Notice: Subject to any disclaimer, the term of this patent is extended or adjusted under 35 U.S.C. 154(b) by 409 days.

(21) Appl. No.: 18/117,178

(22) Filed: Mar. 3, 2023

(65) Prior Publication Data

US 2024/0293934 A1 Sep. 5, 2024

(51) Int. Cl.
*B25J 9/16* (2006.01)
*B25J 11/00* (2006.01)

(52) U.S. Cl.
CPC ............. *B25J 9/1682* (2013.01); *B25J 9/161* (2013.01); *B25J 9/163* (2013.01); *B25J 11/008* (2013.01)

(58) Field of Classification Search
CPC . B25J 9/1682; B25J 9/161; B25J 9/163; B25J 11/008
See application file for complete search history.

(56) References Cited

U.S. PATENT DOCUMENTS 9,796,091 B1 * 10/2017 Soo ........................ G16H 40/67
10,733,004 B2 * 8/2020 Shaw .................. G06F 9/45558
2011/0119226 A1 * 5/2011 Ruhl ...................... G06N 5/048
706/46
2017/0227962 A1 * 8/2017 Cesarano ................. G08G 5/80
2021/0304559 A1 * 9/2021 Cupersmith ............ G07F 17/42

OTHER PUBLICATIONS

Chunjie Chen, Xinyu Wu, Long Han and Yongsheng Ou, "Butler Robot," 2011 IEEE International Conference on Information and Automation, Shenzhen, China, 2011, pp. 732-737, doi: 10.1109/ICINFA.2011.5949090. Accessed Mar. 5, 2025 (Year: 2011).*
Ho Seok Ahn et al., "Entertainment services of a healthcare robot system for older people in private and public spaces," 2015 6th International Conference on Automation, Robotics and Applications (ICARA), Queenstown, New Zealand, 2015, pp. 217-222, doi: 10.1109/ICARA.2015.7081150. Accessed Mar. 25, 2025 (Year: 2015).*

* cited by examiner

*Primary Examiner* — Wade Miles
*Assistant Examiner* — Jaewook Jung
(74) *Attorney, Agent, or Firm* — Nicholas Martin; Greenberg Traurig, LLP; Michael A. Springs

(57) ABSTRACT

Robotic Butlers can be deployed at an entertainment event to perform tasks for users. For example, a computer-implemented method described herein can include deploying a plurality of robotic butlers at the entertainment event. The computer-implemented method can also include receiving at least one task request for a robotic butler of the plurality of robotic butlers from at least one user at the entertainment event. The computer-implemented method can further include instructing the robotic butler of the plurality of robotic butlers to perform at least one task for the at least one user at the entertainment event.

14 Claims, 4 Drawing Sheets

ROBOTIC BUTLER EVENT DEPLOYMENT

TECHNICAL FIELD

The present disclosure relates generally to deployment of services at an entertainment event and, more particularly (although not necessarily exclusively), to optimizing deployment of robotic butlers at an entertainment event.

BACKGROUND

Attendees at an entertainment event can have need of a variety of tasks or services during the entertainment event. For example, an attendee may have need of an escort to return to a vehicle towards an end of the entertainment event. In another example, the attendee may require a cash withdrawal to purchase items provided by event vendors. There can be a need for systems and methods to provide the variety of tasks to the attendees in an efficient manner.

SUMMARY

Robotic butlers capable of performing tasks to assist users can be deployed at an entertainment event. For example, a computer-implemented method described herein can include deploying a plurality of robotic butlers at the entertainment event. The computer-implemented method can further include receiving at least one task request for a robotic butler of the plurality of robotic butlers from at least one user at the entertainment event. Additionally, the computer-implemented model can include instructing the robotic butler of the plurality of robotic butlers to perform at least one task for the at least one user at the entertainment event.

In another example, a system described herein can include a computing device. The computing device can include a processor and a memory that includes instructions executable by the processor for causing the processor to perform operations. The operations can include deploying a plurality of robotic butlers at an entertainment event. The operations can further include receiving at least one task request for a robotic butler of the plurality of robotic butlers from at least one user at the entertainment event. Additionally, the operations can include instructing the robotic butler of the plurality of robotic butlers to perform at least one task for the at least one user at the entertainment event.

In an example, a non-transitory computer-readable medium includes instructions that are executable by a processor for causing the processor to perform operations including deploying a plurality of robotic butlers at an entertainment event. The operations can further include receiving at least one task request for a robotic butler of the plurality of robotic butlers from at least one user at the entertainment event. Additionally, the operations can include instructing the robotic butler of the plurality of robotic butlers to perform at least one task for the at least one user at the entertainment event.

DETAILED DESCRIPTION

Figure 1:
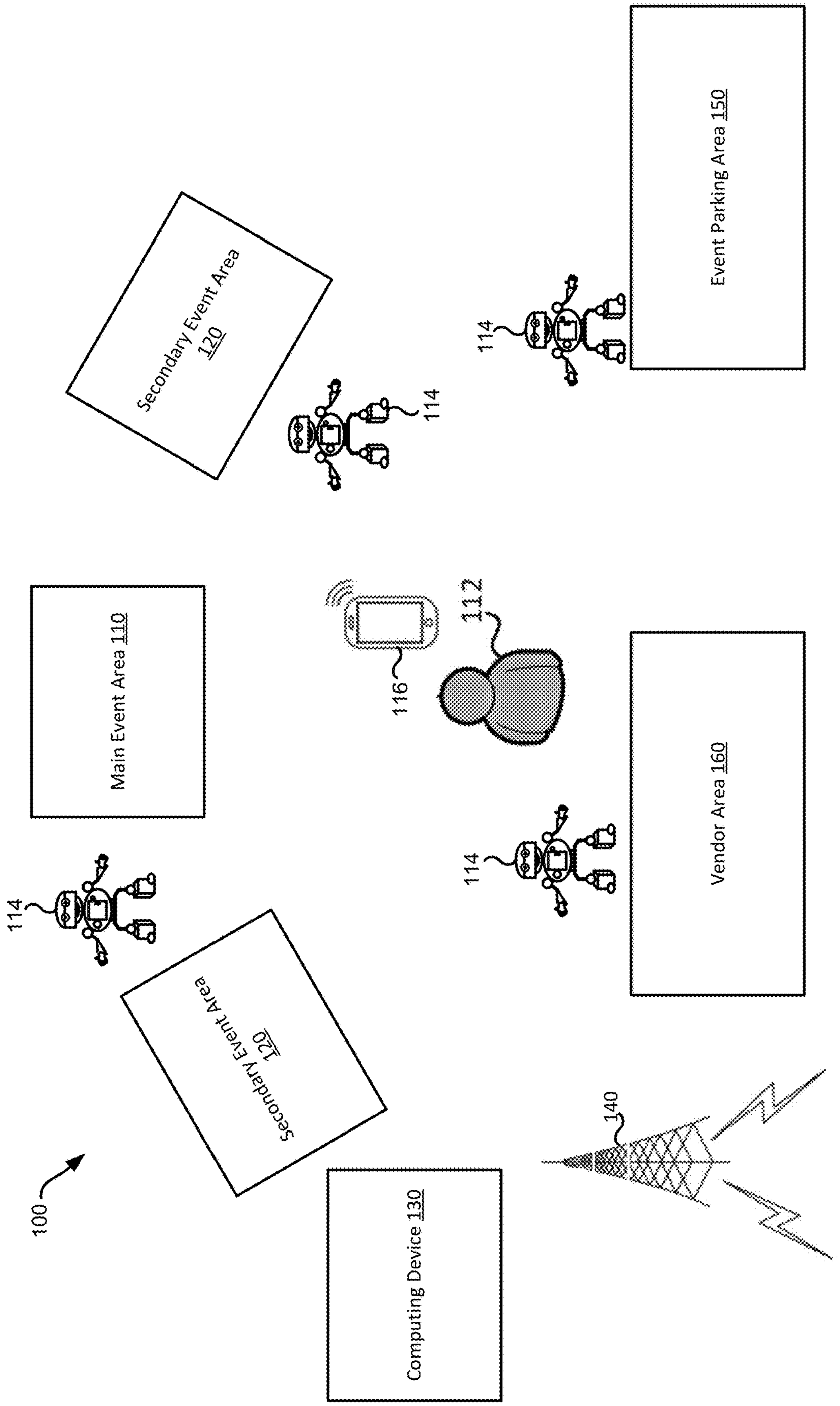
FIG. 1 is a schematic of an entertainment event environment for deploying robotic butlers capable of performing tasks to assist at least one user attending an entertainment event according to one example of the present application.

Certain aspects and examples of the present disclosure relate to a deployment of a plurality of robotic butlers at an entertainment event. Robotic butlers can be robotic entities capable of completing a variety of tasks for users by request at the entertainment event. For example, a user can request that a robotic butler store valuables for a time duration during the entertainment event. The robotic butler can be sent to a location associated with the user. The robotic butler can receive and store the valuables. The robotic butler can distinguish, via facial recognition, voice recognition, or fingerprint identification, the user from other attendees at the entertainment event.

Examples of the entertainment event can include indoor or outdoor music festivals, fairs (e.g., Renaissance fairs, state fairs, county fairs, etc.), sporting events (e.g., boxing events, Olympic trial events, baseball games, football games, hockey games, etc.), convention center events (i.e., monster truck rallies, professional wrestling events, ice capades, etc.) corporate annual meetings (e.g., Berkshire Hathaway annual shareholders event), professional society meeting events (e.g., Materials Research Society Meetings, etc.), amusement park events, and the like.

A computing device can collect data from tasks performed by the plurality of robotic butlers at the entertainment event. The computing device can train, using the collected data and a set of parameters for the entertainment event, a machine-learning model to optimize the deployment of robotic butlers at the entertainment event and more efficiently provide services to users. Optimizing the deployment of robotic butlers can involve minimizing the wait time between tasks or maximizing an amount of completed tasks during a predetermined time duration.

The trained machine-learning model can be applied to a second entertainment event to optimize a deployment of a second plurality of robotic butlers. Deployment of the second plurality of robotic butlers can be based, at least in part, on a result of the machine-learning model. The result of the machine-learning model can include several recommendations for the deployment of the second plurality of robotic butlers. For instance, the recommendations can include a number of robotic butlers, a type of deployment (i.e., autonomously roaming or stationary robotic butlers), a type of robotic butler, etc.

The second entertainment event can be a future entertainment event. In some examples, the computing device can determine whether the future entertainment event qualifies for robotic butler deployment. Determining that the future entertainment event qualifies can include monitoring internet traffic associated with the future entertainment event. Determining that the future entertainment event qualifies can also include recording a cumulative engagement factor on a predetermined number of days (including 0 days) prior to the future entertainment event. Determining that the future entertainment event qualifies for the robotic butler deployment can also involve determining that the cumulative engagement factor exceeds a threshold amount.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of an entertainment event environment 100 for deploying robotic butlers 114 capable of performing tasks to assist at least one user 112 attending an entertainment event according to one example of the present application. The entertainment event environment 100 can include a plurality of robotic butlers 114, a main event area 110, secondary event areas 120, a computing device 130, one or more communication networks 140, a vendor area 160, an event parking area 150, the at least one user 112, and at least one user device 116.

The at least one user device 116 and the plurality of robotic butlers 114 may send or receive information with the computing device 130 over the one or more communication networks 140. Examples of the at least one user device 116 can include a cellphone, smartphone, tablet, laptop, smartwatch, or any type of mobile device. The one or more communication networks 140 may correspond to one or more Wide Area Networks ("WANs"), such as the Internet, through which the at least one user device 116, the plurality of robotic butlers 114, and the computing device 130 may communicate with servers via web browsers or client-side applications, to establish communication sessions, request and receive web-based resources, and access other features of applications or services. Although illustrated separate from the robotic butlers 114 in the entertainment event environment 100, in certain examples, the computing device 130 can be included within at least one of the robotic butlers 114. In other examples, the computing device 130 can be situated in a remote location, such as a centralized base of operations for robotic butler deployment, away from the entertainment event environment 100.

The computing device 130 can deploy the plurality of robotic butlers 114 within the entertainment event environment 100. The computing device 130 can evenly distribute the robotic butlers 114 in the entertainment event environment 100. In some examples, deployment of the robotic butlers 114 can be based on an event time period for the entertainment event. For example, during a first event time period, a majority of the robotic butlers 114 can be situated near the event parking area 150 and the vendor area 160 to accommodate the at least one user 112 as the at least one user 112 arrives at the entertainment event. During a second event time period, the majority of the robotic butlers 114 can be situated near the secondary event areas 120. During a third event time period, the majority of the robotic butlers 114 can be instructed to congregate near the main event area 110. During a final event time period, the robotic butlers 114 can return to the event parking area 150.

The at least one user 112 can communicate with the computing device 130 via the at least one user device 116. The computing device 130 can receive at least one task request for a robotic butler 114 from the at least one user 112. The computing device 130 can instruct at least one robotic butler 114 to perform the at least one task for the at least one user 112. Examples of the at least one task can include temporarily storing valuables for the at least one user 112, saving a spot in line for the at least one user 112, providing a cash withdrawal to the at least one user 112, escorting the at least one user 112 to the event parking area 150, saving a seat for the at least one user 112, or tracking an assailant who robbed the at least one user 112.

In some examples, the computing device 130 can determine a location for the at least one user 112 based on the communication from the at least one user device 116. For each request of the at least one task request, the computing device 130 can determine a nearest robotic butler to the at least one user 112 and the computing device 130 can send the nearest robotic butler to the at least one user 112 to perform the at least one task. In some examples, the computing device 130 can instruct the plurality of robotic butlers 114 to autonomously roam the entertainment event environment 100.

In some examples, the at least one user 112 can communicate directly with the robotic butlers 114. The at least one user 112 can communicate with the robotic butlers 114 via the at least one user device 116, voice commands, sign language, or gestures. In some examples, the robotic butlers 114 can distinguish between the at least one user 112 and other attendees of the entertainment event. For example, the robotic butlers 114 can identify the at least one user 112 by facial recognition or voice recognition.

Figure 2:
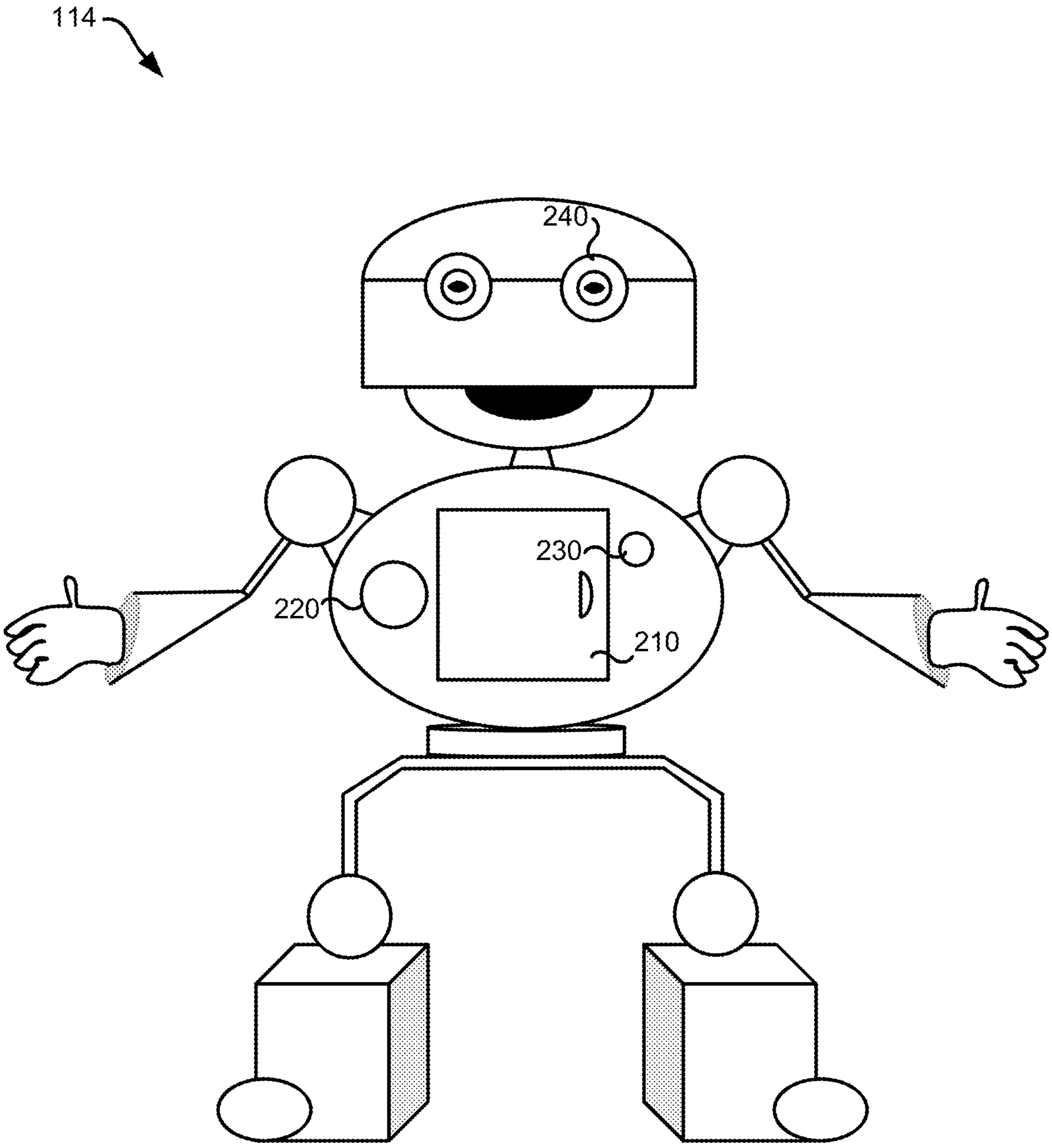
FIG. 2 is a diagram that shows a front view of a robotic butler capable of performing tasks to assist at least one user according to one example of the present application.

FIG. 2 is a diagram that shows a front view of a robotic butler 114 capable of performing tasks to assist at least one user 112 according to one example of the present application. The robotic butler 114 can include a storage compartment 210, an auditory sensor 220, a spray dispenser 230, and at least one camera 240. The robotic butler 114 can store valuables for the at least one user 112 in the storage compartment 210. The robotic butler can use the auditory sensor 220 or the at least one camera 240 to identify the at least one user 112 or to receive instructions from the at least one user 112.

In some examples, the robotic butler 114 can identify an assailant and spray the assailant with a non-toxic spray from the spray dispenser 230. The assailant can be suspected of committing a crime such as theft within or near the entertainment event environment 100. The non-toxic spray can assist the robotic butler 114 to follow and track the assailant. The robotic butler 114 can be informed of the assailant by the computing device 130. In some examples, the robotic butler 114 can witness a crime committed by the assailant and can record the crime using the auditory sensor 220, the at least one camera 240, or both. The robotic butler 114 can confront the assailant in other ways as well. For example, the robotic butler 114 can disarm or deter the assailant by producing a high pitched sonic wave. The robotic butler can include any other non-lethal disarming mechanisms.

Figure 3:
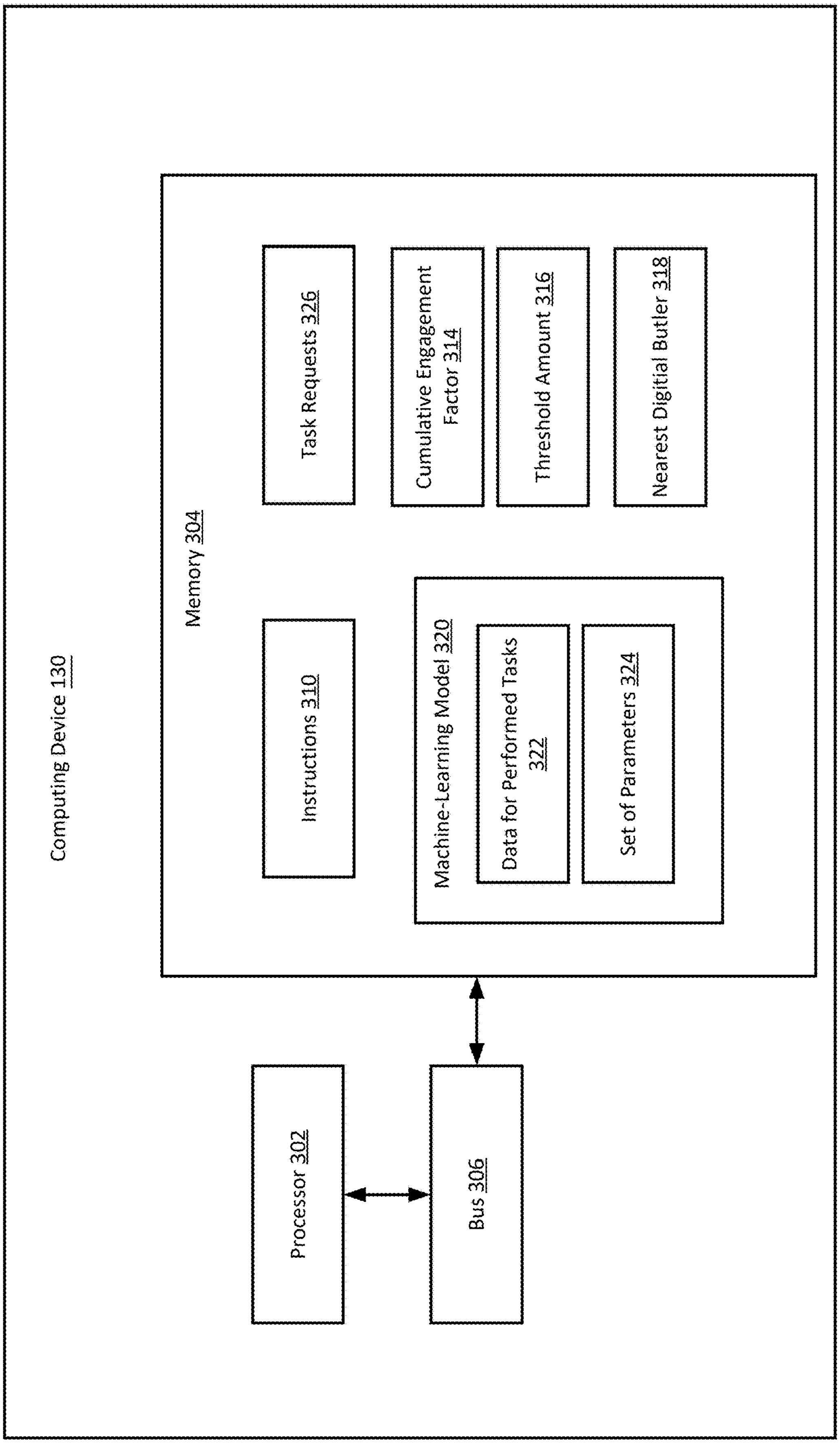
FIG. 3 is a block diagram of a computing device for deploying robotic butlers at an entertainment event environment according to one example of the present application.

FIG. 3 is a block diagram of a computing device 130 for deploying robotic butlers 114 at an entertainment event environment 100 according to one example of the present application. The components shown in FIG. 3, such as a processor 302, a memory 304, a bus 306, and the like, may be integrated into a single structure such as within the single housing of the computing device 130. Alternatively, the components shown in FIG. 3 can be distributed from one another and in electrical communication with each other.

As shown, the computing device 130 includes the processor 302 communicatively coupled to the memory 304 by the bus 306. The processor 302 can include one processor or multiple processors. Non-limiting examples of the processor 302 include a Field-Programmable Gate Array (FPGA), an application specific integrated circuit (ASIC), a microprocessor, or any combination of these. The processor 302 can execute instructions 310 stored in the memory 304 to perform operations. In some examples, the instructions 310 can include processor-specific instructions generated by a compiler or an interpreter from code written in any suitable computer-programming language, such as C, C++, C#, or Java.

The memory 304 can include one memory device or multiple memory devices. The memory 304 can be non-volatile and may include any type of memory device that retains stored information when powered off. Non-limiting examples of the memory 304 include electrically erasable and programmable read-only memory (EEPROM), flash memory, or any other type of non-volatile memory. At least some of the memory 304 can include a non-transitory computer-readable medium from which the processor 302 can read instructions 310. The non-transitory computer-readable medium can include electronic, optical, magnetic, or other storage devices capable of providing the processor 302 with the instructions 310 or other program code. Non-limiting examples of the non-transitory computer-readable medium include magnetic disk(s), memory chip(s), RAM, an ASIC, or any other medium from which a computer processor can read instructions 310.

Additionally, the memory 304 can include task requests 326, a cumulative engagement factor 314, a threshold amount 316, a nearest robotic butler 318, and at least one machine-learning model 320. The machine-learning model 320 can be trained using data for performed tasks 322 and a set of parameters 324.

The processor 302 can collect the data for performed tasks 322 by robotic butlers 114 at an entertainment event. The at least one machine-learning model 320 can be trained, using the data for performed tasks 322 and the set of parameters 324, to optimize a deployment of the robotic butlers 114 at the entertainment event. In some examples, optimizing the deployment of the robotic butlers 114 can include periodically updating parameters for autonomously roaming the entertainment event environment 100. The data for performed tasks 322 can include a type of task performed, a number of robotic butlers 114 deployed in the entertainment event environment 100, a time of completion for each performed task, an amount of valuable space needed to accommodate storage requests, and a wait time between tasks for each robotic butler 114 deployed in the entertainment event environment 100. The set of parameters 324 can include a duration for the entertainment event, a number of attendees at the entertainment event, and a number of vendors at the entertainment event.

The processor 302 can receive the task requests 326 from at least one user 112. Using locations associated with the task requests 326, the processor 302 can determine the most available robotic butler 318 and, in some examples, send the most available robotic butler 318 to the at least one user 112 to perform at least one task. The computing device 130 can derive and maintain an availability ranking of robotic butlers based on availability. The availability ranking can be based on locations of robotic butlers, locations of users that make a task request, whether the robotic butler 318 is currently performing a task, or an estimated time for the robotic butler 318 to perform a current task. In some examples, the computing device 130 can determine the most available robotic butler 318 based at least in part on the availability ranking.

In some examples, the processor 302 can determine that a future entertainment event qualifies for robotic butler deployment. Determining that the future entertainment event qualifies can include monitoring internet traffic associated with the future entertainment event. For example, the processor 302 can track a social media page associated with the future entertainment event and can monitor user engagement on the social media page. For instance, the social media page can include a first option for users to indicate that the users plan to attend the future entertainment event or a second option that allows users to indicate that they are interested in attending the future entertainment event. The processor 302 can monitor the number of users that have selected the first option or the second option. The processor 302 can monitor a number of users that visit a webpage associated with the future entertainment event via a subscription to internet traffic for the webpage.

Determining that the future entertainment event qualifies for robotic butler deployment can involve recording a cumulative engagement factor 314 for the future entertainment event on a predetermined number of days prior to the future entertainment event. The cumulative engagement factor 314 can be based on the internet traffic associated with the future entertainment event. For instance, the cumulative engagement factor 314 can be a cumulative number of user visits to a main webpage for the future entertainment event during a time duration of six months prior to the future entertainment event to one month prior to the future entertainment event. In another example, the cumulative engagement factor 314 can be based on a number of user engagements with a social media page associated with the future entertainment event during a time duration prior to the future entertainment event. The cumulative engagement factor 314 can combine user engagements of multiple webpages or social media pages or can be based on an average number of engagements of multiple webpages or social media pages.

In some examples, determining that the future entertainment event qualifies for robotic butler deployment can also include evaluating a set of parameters associated with the future entertainment event. The set of parameters associated with the future entertainment event can include a venue location for the future entertainment event, a distance between the venue location and a centralized base of operations for robotic butler deployment, an amount of vehicle traffic in a vicinity around the venue location, an amount of area covered by the venue location, a number of vendors for the future entertainment event, a number of third party vendors in the vicinity around the venue location, a number of performers at the future entertainment event, etc.

Additionally, determining that the future entertainment event qualifies for robotic butler deployment can include determining that the cumulative engagement factor 314 exceeds a threshold amount 316. The threshold amount 316 can be based on the set of parameters associated with the future entertainment event. For instance, the threshold amount 316 can be reduced when the distance between and the centralized base of operations for robotic butler deployment is less than a predetermined deployment radius.

The processor 302 can train, using the data for performed tasks 322 and the set of parameters 324 for the entertainment event, the machine-learning model 320 to optimize a deployment of a plurality of robotic butlers 114 at the entertainment event. The processor 302 can apply the machine-learning model 320 to a second entertainment event to optimize a deployment of a second plurality of robotic butlers 114. The processor 302 can deploy, based at least in part on a result of the machine-learning model 320, the second plurality of robotic butlers 114 at the second entertainment event.

The data for performed tasks 322 can include a type of task performed, a number of robotic butlers 114, a time of completion for each performed task, an amount of available space needed to accommodate storage requests, or a wait time between tasks for each robotic butler 114. The set of parameters 324 can include a duration of the entertainment event, a number of attendees at the entertainment event, a number of users at the entertainment event, an area covered by the entertainment event, or a number of event vendors at the entertainment event.

Figure 4:
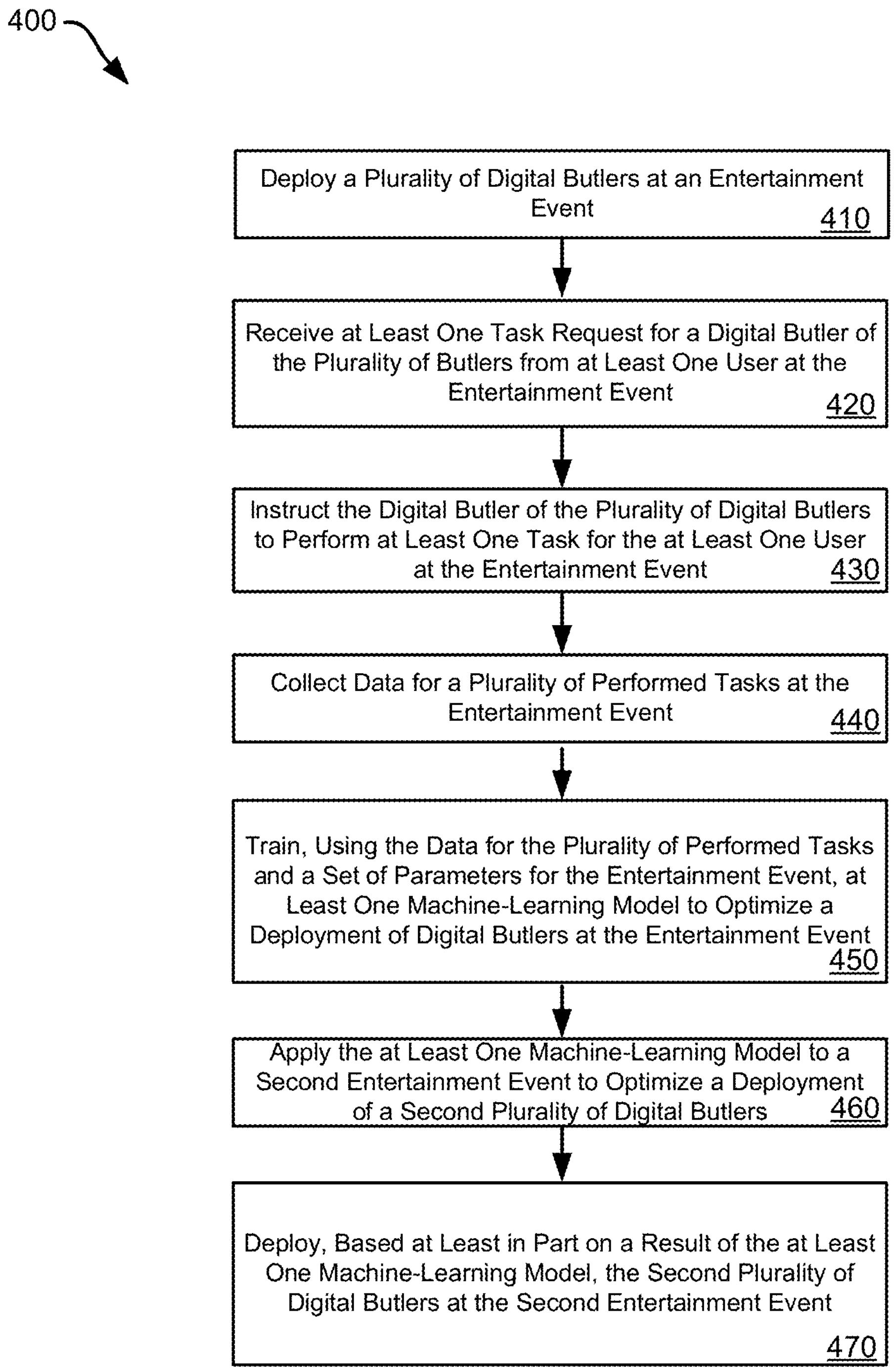
FIG. 4 is a flow chart of a process for deploying robotic butlers at an entertainment event environment according to one example of the present application.

In some examples, the computing device 130 can implement a process 400 shown in FIG. 4 for effectuating some aspects of the present disclosure. Other examples can involve more operations, fewer operations, different operations, or a different order of the operations shown in FIG. 4.

FIG. 4 is a flow chart of a process 400 for deploying robotic butlers 114 at an entertainment event environment 100 according to one example of the present application. Operations of processes may be performed by software, firmware, hardware, or a combination thereof. The operations of the process 400 start at block 410.

At block 410, the process 400 involves deploying a plurality of robotic butlers 114 at an entertainment event. A number of robotic butlers 114 of the plurality of robotic butlers can be determined based on several factors. The factors can include a time duration for the entertainment event, an anticipated number of attendees for the entertainment event, a number of performances at the entertainment event, a number of event vendors, or an amount of area covered by the entertainment event environment 100. As the entertainment event continues, robotic butlers 114 can be added or removed from the entertainment event environment 100.

In some examples, a decision to deploy the plurality of robotic butlers 114 can be based on a comparison between a cumulative engagement factor 314 and a threshold amount 316. The cumulative engagement factor 314 can be based on the internet traffic associated with the future entertainment event. For instance, the cumulative engagement factor 314 can be a cumulative number of user visits to a main webpage for the future entertainment event during a time duration of six months prior to the future entertainment event to one month prior to the future entertainment event. In another example, the cumulative engagement factor 314 can be based on a number of user engagements with a social media page associated with the future entertainment event during a time duration prior to the future entertainment event. The cumulative engagement factor 314 can combine user engagements of multiple webpages or social media pages or can be based on an average number of engagements of multiple webpages or social media pages.

The plurality of robotic butlers 114 can initially be evenly distributed throughout an entertainment event environment 100. The plurality of robotic butlers 114 can be instructed to autonomously roam the entertainment event environment 100. In some examples, deployment of the robotic butlers 114 can be based on an event time period for the entertainment event. For example, during a first event time period, a majority of the robotic butlers 114 can be situated near an event parking area 150 and a vendor area 160 to accommodate at least one user 112 as the at least one user 112 arrives at the entertainment event. During a second event time period, the majority of the robotic butlers 114 can be situated near secondary event areas 120. During a third event time period, the majority of the robotic butlers 114 can be instructed to congregate near a main event area 110. During a final event time period, the robotic butlers 114 can return to the event parking area 150.

At block 420, the process 400 involves receiving at least one task request for a robotic butler 114 from at least one user 112 at the entertainment event. In some examples, the at least one request can be received by a computing device 130 via at least one user device 116. Examples of the at least one user device 116 can include a cellphone, smartphone, tablet, laptop, smartwatch, or any type of mobile device. Users can have access to a website or application software to send in task requests using the at least one user device 116. In some examples, the at least one task request can be received directly by the robotic butler 114. The robotic butler 114 can be configured to understand sign language, verbal commands, or gestures. In some examples, the robotic butlers 114 can distinguish between the at least one user 112 and other attendees of the entertainment event. For example, the robotic butlers 114 can identify the at least one user 112 by facial recognition or voice recognition.

Examples of types of tasks that can be requested by the at least one user 112 include temporarily storing valuables for the at least one user 112, saving a spot in a line for the at least one user 112, providing a cash withdrawal to the at least one user 112, escorting the at least one user 112 to the event parking area 150, saving a seat for the at least one user 112, or tracking an assailant who robbed the at least one user 112.

At block 430, the process 400 can involve instructing at least one robotic butler 114 to perform at least one task for the at least one user 112 at the entertainment event. In some examples, the computing device 130 can determine a location for the at least one user 112 based on the communication from the at least one user device 116. For each request of the at least one task request, the computing device 130 can determine a most available robotic butler to the at least one user 112 and the computing device 130 can send the most available robotic butler to the at least one user 112 to perform the at least one task. The computing device 130 can derive and maintain an availability ranking of robotic butlers based on availability. The availability ranking can be based on locations of robotic butlers, whether the robotic butler is currently performing a task, or an estimated time for the robotic butler to perform a current task. In some examples, the computing device 130 can determine the most available robotic butler based at least in part on the availability ranking.

In some examples, the robotic butler 114 can identify an assailant or suspected criminal and spray the assailant with a non-toxic spray from a spray dispenser 230. The assailant can be suspected of committing a crime such as theft within or near the entertainment event environment 100. The non-toxic spray can assist the robotic butler 114 to follow and track the assailant. The robotic butler 114 can be informed of the assailant by the computing device 130. In some examples, the robotic butler 114 can witness a crime committed by the assailant and can record the crime using an auditory sensor 220, at least one camera 240, or both.

At block 440, the process 400 involves collecting data for a plurality of performed tasks 322 at the entertainment event. The data for the plurality of performed tasks 322 can include a type of task performed, a number of robotic butlers 114, a time of completion for each performed task, an amount of available space needed to accommodate storage requests, or a wait time between tasks for each robotic butler 114. The data can also include audio or visual data recorded by auditory sensors 220, or at least one camera 240 of the robotic butlers 114.

At block 450, the process 400 involves training, using the data for the plurality of performed tasks 322 and a set of parameters 324 for the entertainment event, at least one machine-learning model 320 to optimize a deployment of robotic butlers 114 at the entertainment event. The set of parameters 324 can include a duration of the entertainment event, a number of attendees at the entertainment event, a number of users at the entertainment event, an area covered by the entertainment event, or a number of event vendors at the entertainment event. Optimizing the deployment of the robotic butlers 114 can involve minimizing the wait time between tasks or maximizing an amount of completed tasks during a predetermined time duration.

At block 460, the process 400 involves applying the at least one machine-learning model to a second entertainment event to optimize a deployment of a second plurality of robotic butlers. The second entertainment event can be a future entertainment event. In some examples, the computing device 130 can determine whether the future entertainment event qualifies for robotic butler deployment. Determining that the future entertainment event qualifies can include monitoring internet traffic associated with the future entertainment event. Determining that the future entertainment event qualifies can also include recording a cumulative engagement factor 314 on a predetermined number of days (including 0 days) prior to the future entertainment event. Determining that the future entertainment event qualifies for the robotic butler deployment can also involve determining that the cumulative engagement factor 314 exceeds a threshold amount 316.

At block 470, the process 400 involves deploying, based at least in part on a result of the at least one machine-learning model 320, the second plurality of robotic butlers at the second entertainment event. The result of the at least one machine-learning model 320 can include several recommendations for the deployment of the second plurality of robotic butlers. For instance the recommendations can include a number of robotic butlers 114, a type of deployment (i.e., autonomously roaming or stationary robotic butlers 114), a type of robotic butler, etc.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A computer-implemented method comprising:

determining that an entertainment event qualifies for a robotic butler deployment by, during a period of time prior to the entertainment event:

monitoring a webpage associated with the entertainment event to derive a number of visitors to the webpage;

monitoring a social media page associated with the entertainment event to derive a number of user engagements with the social media page;

generating a cumulative engagement factor based on the number of visitors to the webpage and the number of user engagements with the social media page;

generating a threshold amount based on a set of parameters associated with the entertainment event, wherein the set of parameters comprise a location of the entertainment event and a distance between a location corresponding to a central base of robotic butler deployment and the location of the entertainment event, wherein the threshold amount generated is lower when the distance between the location corresponding to the central base of robotic butler deployment and the location of the entertainment event is less than a predetermined deployment radius; and determining that the cumulative engagement factor exceeds the threshold amount;

in response to determining that the entertainment event qualifies for the robotic butler deployment:

determining a number of a plurality of robotic butlers to be deployed at the entertainment event based on a time duration for the entertainment event, an anticipated number of attendees for the entertainment event, a number of performances at the entertainment event, a number of event vendors at the entertainment event, and an amount of area covered by an environment of the entertainment event; and deploying the number of the plurality of robotic butlers at the entertainment event, wherein deployment of the plurality of robotic butlers at the entertainment event is based on a set of event time periods for the entertainment event, wherein, during a first event time period of the set of event time periods, at least half of the plurality of the robotic butlers are deployed to a parking area associated with the entertainment event;

receiving a task request for a robotic butler of the plurality of robotic butlers from a user device at the entertainment event;

upon receiving the task request for the robotic butler of the plurality of robotic butlers from the user device at the entertainment event:

assigning a task to the robotic butler of the plurality of robotic butlers upon determining that the robotic butler of the plurality of robotic butlers is a highest ranked robotic butler based on an availability ranking of the plurality of robotic butlers, wherein the availability ranking of the plurality of robotic butlers is based on locations of the plurality of robotic butlers with respect to a location associated with the task request and a determination of whether each of the plurality of robotic butlers is currently performing another task; and instructing the robotic butler of the plurality of robotic butlers to perform the task for a user associated with the user device at the entertainment event.

2. The computer-implemented method of claim 1, further comprising:

collecting data for a plurality of performed tasks at the entertainment event;

training, using the data for the plurality of performed tasks and a set of parameters for the entertainment event, at least one machine-learning model to optimize a deployment of robotic butlers at the entertainment event;

applying the at least one machine-learning model to a second entertainment event to optimize a deployment of a second plurality of robotic butlers; and deploying, based at least in part on a result of the at least one machine-learning model, the second plurality of robotic butlers at the second entertainment event.

3. The computer-implemented method of claim 2, wherein the data comprises a type of task performed, a number of robotic butlers in the plurality of robotic butlers, a time of completion for each performed task, an amount of valuable space needed to accommodate storage requests, or a wait time between tasks for each robotic butler of the plurality of robotic butlers.

4. The computer-implemented method of claim 1, further comprising instructing the robotic butler of the plurality of robotic butlers to autonomously roam the entertainment event.

5. The computer-implemented method of claim 1, wherein the task comprises temporarily storing valuables for the user, saving a spot in line for the user, providing a cash withdrawal to the user, escorting the user to an event parking area, saving a seat for the user, or tracking an assailant who robbed the user.

6. A system comprising:
a computing device comprising:
a processor; and
a memory that includes instructions executable by the processor for causing the processor to perform operations comprising:
determining that an entertainment event qualifies for a robotic butler deployment by, during a period of time prior to the entertainment event:
monitoring a webpage associated with the entertainment event to derive a number of visitors to the webpage;
monitoring a social media page associated with the entertainment event to derive a number of user engagements with the social media page;
generating a cumulative engagement factor based on the number of visitors to the webpage and the number of user engagements with the social media page;
generating a threshold amount based on a set of parameters associated with the entertainment event, wherein the set of parameters comprise a location of the entertainment event and a distance between a location corresponding to a central base of robotic butler deployment and the location of the entertainment event, wherein the threshold amount generated is lower when the distance between the location corresponding to the central base of robotic butler deployment and the location of the entertainment event is less than a predetermined deployment radius; and
determining that the cumulative engagement factor exceeds the threshold amount;
in response to determining that the entertainment event qualifies for the robotic butler deployment:
determining a number of a plurality of robotic butlers to be deployed at the entertainment event based on a time duration for the entertainment event, an anticipated number of attendees for the entertainment event, a number of performances at the entertainment event, a number of event vendors at the entertainment event, and an amount of area covered by an environment of the entertainment event; and
deploying the number of the plurality of robotic butlers at an entertainment event, wherein deployment of the plurality of robotic butlers at the entertainment event is based on a set of event time periods for the entertainment event, wherein, during a first event time period of the set of event time periods, at least half of the plurality of the robotic butlers are deployed to a parking area associated with the entertainment event;
receiving a task request for a robotic butler of the plurality of robotic butlers from a user device at the entertainment event;
upon receiving the task request for the robotic butler of the plurality of robotic butlers from the user device at the entertainment event:
assigning a task to the robotic butler of the plurality of robotic butlers upon determining that the robotic butler of the plurality of robotic butlers is a highest ranked robotic butler based on an availability ranking of the plurality of robotic butlers, wherein the availability ranking of the plurality of robotic butlers is based on locations of the plurality of robotic butlers with respect to a location associated with the task request and a determination of whether each of the plurality of robotic butlers is currently performing another task; and
instructing the robotic butler of the plurality of robotic butlers to perform the task for a user associated with the user device at the entertainment event.

7. The system of claim 6, wherein the operations further comprise:
collecting data for a plurality of performed tasks at the entertainment event;
training, using the data for the plurality of performed tasks and a set of parameters for the entertainment event, at least one machine-learning model to optimize a deployment of robotic butlers at the entertainment event;
applying the at least one machine-learning model to a second entertainment event to optimize a deployment of a second plurality of robotic butlers; and
deploying, based at least in part on a result of the at least one machine-learning model, the second plurality of robotic butlers at the second entertainment event.

8. The system of claim 7, wherein the data comprises a type of task performed, a number of robotic butlers in the plurality of robotic butlers, a time of completion for each performed task, an amount of valuable space needed to accommodate storage requests, and a wait time between tasks for each robotic butler of the plurality of robotic butlers.

9. The system of claim 6, wherein the operations further comprise instructing the robotic butler of the plurality of robotic butlers to autonomously roam the entertainment event.

10. The system of claim 6, wherein the task comprises temporarily storing valuables for the user, saving a spot in line for the user, providing a cash withdrawal to the user, escorting the user to an event parking area, saving a seat for the user, or tracking an assailant who robbed the user.

11. A non-transitory computer-readable medium comprising instructions that are executable by a processor for causing the processor to perform operations comprising:
determining that an entertainment event qualifies for a robotic butler deployment by, during a period of time prior to the entertainment event:
monitoring a webpage associated with the entertainment event to derive a number of visitors to the webpage;
monitoring a social media page associated with the entertainment event to derive a number of user engagements with the social media page;
generating a cumulative engagement factor based on the number of visitors to the webpage and the number of user engagements with the social media page;
generating a threshold amount based on a set of parameters associated with the entertainment event, wherein the set of parameters comprise a location of the entertainment event and a distance between a location corresponding to a central base of robotic butler deployment and the location of the entertainment event, wherein the threshold amount generated is lower when the distance between the location corresponding to the central base of robotic butler deployment and the location of the entertainment event is less than a predetermined deployment radius; and determining that the cumulative engagement factor exceeds the threshold amount;

in response to determining that the entertainment event qualifies for the robotic butler deployment:

determining a number of a plurality of robotic butlers to be deployed at the entertainment event based on a time duration for the entertainment event, an anticipated number of attendees for the entertainment event, a number of performances at the entertainment event, a number of event vendors at the entertainment event, and an amount of area covered by an environment of the entertainment event; and deploying the number of the plurality of robotic butlers at an entertainment event, wherein deployment of the plurality of robotic butlers at the entertainment event is based on a set of event time periods for the entertainment event, wherein, during a first event time period of the set of event time periods, at least half of the plurality of the robotic butlers are deployed to a parking area associated with the entertainment event;

receiving a task request for a robotic butler of the plurality of robotic butlers from a user device at the entertainment event;

upon receiving the task request for the robotic butler of the plurality of robotic butlers from the user device at the entertainment event:

assigning a task to the robotic butler of the plurality of robotic butlers upon determining that the robotic butler of the plurality of robotic butlers is a highest ranked robotic butler based on an availability ranking of the plurality of robotic butlers, wherein the availability ranking of the plurality of robotic butlers is based on locations of the plurality of robotic butlers with respect to a location associated with the task request and a determination of whether each of the plurality of robotic butlers is currently performing another task; and instructing the robotic butler of the plurality of robotic butlers to perform the task for a user associated with the user device at the entertainment event.

12. The non-transitory computer-readable medium of claim 11, wherein the operations further comprise:

collecting data for a plurality of performed tasks at the entertainment event;

training, using the data for the plurality of performed tasks and a set of parameters for the entertainment event, at least one machine-learning model to optimize a deployment of robotic butlers at the entertainment event;

applying the at least one machine-learning model to a second entertainment event to optimize a deployment of a second plurality of robotic butlers; and deploying, based at least in part on a result of the at least one machine-learning model, the second plurality of robotic butlers at the second entertainment event.

13. The non-transitory computer-readable medium of claim 12, wherein the data comprises a type of task performed, a number of robotic butlers in the plurality of robotic butlers, a time of completion for each performed task, an amount of valuable space needed to accommodate storage requests, and a wait time between tasks for each robotic butler of the plurality of robotic butlers.

14. The non-transitory computer-readable medium of claim 11, wherein the task comprises temporarily storing valuables for the user, saving a spot in line for the user, providing a cash withdrawal to the user, escorting the user to an event parking area, saving a seat for the user, or tracking an assailant who robbed the user.

* * * * *